United States Patent [19]

Brown

[11] 4,095,985
[45] Jun. 20, 1978

[54] THERMAL BARRIER COMPOSITIONS

[75] Inventor: William F. Brown, Bonduel, Wis.

[73] Assignee: Vast Products, Inc., Bonduel, Wis.

[21] Appl. No.: 730,259

[22] Filed: Oct. 5, 1976

[51] Int. Cl.$^2$ .............................................. C09K 3/28
[52] U.S. Cl. .................. 106/15 FP; 106/77; 106/84; 252/8.1; 252/62
[58] Field of Search .............. 106/15 FP, 77, 84, 109, 106/287 S, 67, 71, 122, 38.3, 38.35; 252/7, 8.1, 62; 427/390 D

[56] References Cited

U.S. PATENT DOCUMENTS

| | | | |
|---|---|---|---|
| 2,631,977 | 3/1953 | Allen et al. | 252/7 |
| 3,326,701 | 6/1967 | Von Freyhold | 106/38.3 |
| 3,493,401 | 2/1970 | Schutt et al. | 106/15 FP |
| 3,865,760 | 2/1975 | Pitts | 106/15 FP |
| 3,885,980 | 5/1975 | Noone | 106/109 |

Primary Examiner—Lorenzo B. Hayes
Assistant Examiner—W. Thompson

[57] ABSTRACT

A composition which is particularly adapted for coating structural surfaces to provide them with a thermal carrier to protect them from the detrimental effects of fire comprises an aqueous mixture of (a) lithium mica, (b) wollastonite, (c) aluminum trihydrate, (d) nepheline syenite, and (e) soda bicarbonate. The composition may be diluted with water to facilitate application. The composition may also contain raw vermiculite, sodium aluminum sulfate, borax, calcium sulfate, sodium silicate and other additives to improve the fireproofing, insulating and/or structural strength properties of the material.

5 Claims, No Drawings

THERMAL BARRIER COMPOSITIONS

BACKGROUND OF THE INVENTION

It has long been recognized that a need exists for an effective, safe and inexpensive composition which can be used to coat structural surfaces to provide a thermal barrier to protect them from the detrimental effects of accidental fires. The fairly recent use of synthetic polymeric foam materials such as styrofoam and polyurethane foam as structural building materials and the later discovery that such materials upon exposure to fire can release noxious gases or fumes has created a demand for compositions which can be used to coat the exposed surfaces of such polymeric materials to provide a thermal barrier.

Among the various attempts that have been made to develop materials which can be used to coat such polymeric surfaces have been the development of coatings which contain, in addition to fire resistant substances, organic binders such as asphalt or synthetic polymers to help the fire resistant materials to adhere to the structural surfaces. The use of most organic binders is considered undesirable for the use of such materials is often expensive and almost invariably detracts from the fireproofing ability of the resulting thermal barrier. None of the existing compositions appear to completely satisfy the need for an effective, safe and inexpensive thermal barrier coating material.

SUMMARY OF THE INVENTION

It is a general object of the present invention to disclose novel, inexpensive compositions comprised of inorganic substances which adhere tightly to the surfaces to which they are applied and provide a thermal barrier coating to protect and insulate the surfaces from the detrimental effects of fire.

The compositions of the present invention comprise an aqueous mixture of (a) lithium mica, (b) wollastonite, (c) aluminum trihydrate, (d) nepheline syenite and (e) soda bicarbonate and water. The mixture may be further diluted with water so that it can be readily applied to the surface to be protected.

It is a further object of the invention to disclose compositions which provide thermal barrier coatings which can be readily and easily applied to structural surfaces by brushing, troweling, or spraying.

It is a further object to disclose additional compositions in which ingredients are included which not only increase the outstanding fireproofing characteristics of the basic composition but which also contribute insulating properties and structural strength.

It is a still further object to disclose compositions which provide thermal barrier coatings which when applied to structural surfaces give those surfaces attractive decorative finishes.

DESCRIPTION OF THE PREFERRED EMBODIMENTS

In the preferred practice of the present invention, the basic thermal barrier coating composition is comprised of an aqueous mixture of lithium mica, 5-25%, nepheline syenite 25-70%, wollastonite, 1-60%, aluminum trihydrate, 1-50%, and soda bicarbonate ½-3%, in which the percentages are based on the volume of the mixture including water.

Especially preferred where fireproofing alone is required is the basic thermal barrier coating composition which comprises about 18% lithium mica (W. G. Ground No. 88); about 30% nepheline syenite; about 9% wollastonite; about 9% aluminum trihydrate; about 2% of bicarbonate of soda and the remainder water.

A second embodiment of the thermal barrier coating composition which has been found to provide superior insulating properties contains in addition to the ingredients of the basic composition 10-15% of sodium aluminum sulfate; 1-15% of borax; 10-25% raw vermiculite and 5-55% of sodium silicate.

In the especially preferred form of the second embodiment, the composition contains about 18% lithium mica; about 30% nepheline syenite; about 9% wollastonite; about 9% aluminum trihydrate; about 2% bicarbonate of soda; about 12% sodium aluminum sulfate; about 3% borax; about 10% sodium silicate; about 5% raw vermiculite; and the remainder water.

A third embodiment which has been found to not only possess fireproofing and insulating properties but also to contribute structural strength to the surface to which it is applied contains in addition to the ingredients of the basic composition 1-10% of sodium aluminum sulfate; 2-6% of calcium sulfate; 10-25% of raw vermiculite; 1-16% of borax; and 5-55% of sodium silicate.

In the especially preferred form of the third embodiment, the composition contains about 18% lithium mica; about 30% nepheline syenite; about 9% wollastonite; about 2% aluminum trihydrate; about 2% of calcium sulfate; about 15% raw vermiculite; about 1% bicarbonate of soda; about 3% borax; about 12% sodium silicate and the remainder water.

In the foregoing embodiments, all the percentages are calculated on the basis of the volume of the final mixture including water.

The basic thermal barrier coating composition and the various embodiments thereof are prepared by essentially the same procedure. First, a preblended base product is prepared and diluted with water and placed in packages for later shipment and then later the remaining ingredients which are not contained in the preblended base material are added at the time of application.

The preblended base product for each of the embodiments is prepared by placing all of the ingredients except sodium silicate, calcium sulfate, borax and bicarbonate of soda in a blender at idle. Then, if desired, the sodium silicate, if it is to be added, and the water are added. Not all of the water need be added if the amount added is sufficient to produce a pumpable preblended base material.

The blender is preferably operated at a relatively low speed to produce a blending and folding action. The blending operation is discontinued as soon as the materials are uniformly distributed within the blend and the blend is pumpable. The blending time should preferably not exceed 2½ minutes, of course, will depend upon the particular mix. Excessive blending is to be avoided as some of the materials have a tendency to "shear" during mixing which appears to affect the functional properties of the final products. The preblended base composition may be stored in closed containers with water for substantial periods of time. If any loss of flowability occurs, additional water can be added as needed.

The final blend is preferably accomplished at the time of application. It is at that time that the calcium sulfate, borax and bicarbonate of soda are added. The sodium silicate if not added earlier, may also be added at this time. The viscosity of the composition may be adjusted at the site by addition of water. Generally speaking, it is not desirable to increase the concentration of water in excess of 25–30% of the total blend.

Depending upon its water content, the particular composition will have a consistency like paint or like plaster. As previously indicated, depending upon its consistency, the composition may be applied to the surface to be protected by brushing, rolling, troweling, spraying or any other suitable means. It is obvious that the compositions must be applied within the "setup" or working times which by proper adjustment of the ingredients can range from several minutes to four hours.

The desired "setting" and working time for the structural strength supplying composition is determined by the concentration of the calcium sulfate which provides the primary catalytic action which causes the material to setup after application and the concentration of the bicarbonate of soda which not only causes a release of carbon dioxide but also contributes to the catalyzing action within the blend. The content of the borax also appears to effect the setup time. Generally speaking, the higher the concentration of these materials, the quicker the setup time.

While the exact theory by which the thermal barrier coating compositions of the present invention function to provide their superior properties is not known, it appears from visual observations of the material when it is exposed to fire and heat that as the temperature to which the coating is exposed increases, the coating material expands substantially to provide increased insulation which protects the underlying structure. It also appears that when the coating is subjected to temperatures of about 450° F, a gas is released which does not support combustion and appears to be a flame retardant and that at temperatures above 450° F, water appears to come from the coating to retard combustion.

The ingredients of a basic thermal barrier coating composition and those employed as additives are all known materials.

The mica preferred for use in the composition is lithium mica (W. G. Ground No. 88) which is also known as lipidolite and has the formula $(Li, K, Na)_2 Al_2 (SiO_3)_3 (F, OH)_2$. Mica appears not only to insulate but also to facilitate in the presence of high temperatures the release of carbon dioxide which has a fire retardant effect.

The nepheline syenite is a blend of naturally found materials and contains approximately 18 different identifiable substances. Primarily, it contains sodium potassium aluminum silicate. The material is mined about Ontario, Canada and is marketed by Chem-Materials of Akron, Ohio under the name MINEX. Two blends of the material preferred for use are MIXEX No. 4 and MINEX No. 7. The nepheline syenite functions as a thermal barrier as well as a binding agent.

The bicarbonate of soda functions primarily to release carbon dioxide from the composition in the presence of heat. Carbon dioxide, of course, helps to retard and extinguish the fire. In addition, the release of the gas from the bicarbonate of soda helps to create a cellular structure in the thermal barrier coating. The bicarbonate of soda also appears to serve a minor catalyzing function to help "setup" the material when the calcium sulfate is present. Other alkali metal bicarbonates might also be used but they are more expensive than soda bicarbonate.

Wollastonite is a form of calcium silicate and contains significant water of hydration. Wollastonite is a natural material marketed by Harwick Chemical Company of Elk Grove Village, Ilinois. It adds structural strength to the final product and appears to function as a strong binder. It also serves as a heat seal barrier and appears to have a high ability to dissipate heat. The material is fibrous or fine granular crystalline material which is insoluble and has a melting point of 1540° F.

The aluminum trihydrate which has the formula $Al(OH)_3.3H_2O$ functions not only as a physical barrier to fire but also releases water of hydration at elevated temperatures which helps retard and put out the fire. The release temperature for the water varies between 400°–600° F depending on the carbon content of the fire. It appears that the higher the carbon content of the fire, the lower the release temperature.

The sodium aluminum sulfate (soda alum) provides a physical barrier to fire and heat and also releases a great deal of water of hydration. It may also contribute to the release of carbon dioxide from the bicarbonate of soda.

The hydrated calcium sulfate has several functions. It is included in the embodiment which provides structural strength to aid in the mechanical bonding and holding together of all the materials. It also serves as a catalyst that causes the blend to set and harden into a solid structural mass. The calcium sulfate can also be used to regulate the set time of the blend which can be varied from minutes to four hours. The more calcium sulfate which is incorporated into the blend, the quicker the set time. Calcium sulfate in addition to serving as a binder and structural strength contributing agent serves as a physical barrier and since it contains significant water of hydration also serves as a flame retardant material.

The vermiculite which is employed is a naturally occurring mineral substance which has been used in the past as an insulating material. However, for use in the present invention, raw unexpanded vermiculite is employed and functions as a physical barrier and insulating material. In its raw form, vermiculite is in the form of very small flat flakes having estimated dimensions of 1/16 inch diameter and 0.002 – 0.005 inch thickness. The compositions of the present invention which contain raw vermiculite expand when they are heated to provide greater insulation and resistance to the fire. Depending upon the concentration of the vermiculite and the heat, the thermal barrier coating may increase in volume as much as approximately three times its original volume. Within the ranges indicated, the more vermiculite which is added to the product, the better the resistance to fire. The use of raw vermiculite also provides significant shipping and storage advantages.

Borax, of course, is a known flame retardant and serves the same function in the compositions of the present invention. Borax in addition to being heat resistant, releases significant water hydration at 100° C as well as additional water of hydration at 150° C.

The sodium silicate is a known fireproofing agent and serves as a fire retardant material. It also serves as a binding agent.

If desired, a variety of other ingredients may be employed, for example, the vermiculite can be replaced with perlite of similar insulating materials.

The practice of the present invention will be further illustrated by the examples which follow.

EXAMPLE 1

A composition was prepared containing the following ingredients in which the percentages are based on the volume of the mixture including water.

| | |
|---|---|
| Lithium mica (W. G. Ground No. 88) | 18% |
| Nepheline syenite | 30% |
| Wollastonite | 9% |
| Aluminum trihydrate | 9% |
| Bicarbonate of soda | 2% |
| Water | 32% |

The composition was prepared by preblending the dry ingredients, except for the bicarbonate of soda, to form a uniform mixture. Sufficient water was then added with stirring to adjust the preblend to a pumpable mixture. The remainder of the water and the bicarbonate of soda was added to the mixture with stirring at time of application.

EXAMPLE 2

The ability of the composition of Example 1 to provide a thermal barrier and protective coating when applied to 1.5 inches or more of urethane foam was evaluated in a "full scale corner burn test". In the test a nominal 75 mil wet applied thickness of the composition was applied to the walls and ceiling of a test cell constructed in accordance with section V-A-1 of the "Proposed Criteria for Foam Plastics under Section 1717 of the 1976 Uniform Building Code." The closed end wall, the ceiling and a side wall of the test cell had previously been coated with 1½ inches of polyurethane foam (Coro Form G-389, Cook Paint and Varnish Corp.). The composition of Example 1 was applied to the walls using a hydraulically veined pump spray gun utilizing 80 PSI air pressure. Because of the irregularity of the surface of the sprayed foam on the walls, ceiling and end wall, the macro measurement of the mean depth was greater than 1.5 inches whereas the micro profile showed extensive irregularities with peak to trough variations as great as ⅜ inch to less than ¼ inch. Two 2 inch square plugs were removed from the surface of the end wall, ceiling and side wall which had been coated with foam. The mean sample thickness of the coating was 0.0754 inches with no overall standard deviation of 0.0272 inches. The measurements were obtained after a 48 to 50 hour cure time.

After the coating had cured, a 30 pound fuel crib was constructed in the corner of the test cell formed by the junction of the urethane foam coated side wall and end wall. The fuel crib was ignited and allowed to burn for the full 15 minutes of the full scale burn test. During the burn test the temperatures to which the coated surfaces of the end wall, ceiling and side walls were exposed were recorded. The temperature recording devices indicated that the coated surfaces were exposed to temperatures as high as 1600° F during the burn test.

Upon completion of the burn test, the interior of the test cell was examined. It was found that the urethane foam coated walls which had been coated with the composition of Example 1 were fully protected from the detrimental effects of the full scale burn test. Post fire samples taken from adjacent locations of the previous prefire samples of the coating yielded a 0.0988 inch mean which fell within the standard deviation of the prefired measurements but suggested that there was an expansion of the coating by the heat. It was the opinion of the impartial engineer who conducted the test that the coating of the material of Example 1 did completely inhibit the fire characteristics of the 30 pound fuel crib from involving the urethane foam which it was protecting during the full 15 minutes of the full scale burn test.

EXAMPLE 3

To further demonstrate the fire protective properties of the composition of Example 1, a ¼ inch plywood board was coated on one side with a 10 mil layer of the composition of Example 1. The coated layer was allowed to cure. Surprisingly, after curing, the plywood board could be flexed without cracking or peeling of the thermal barrier coating. The blue flame of a blow torch was then applied directly to the coating on the plywood for approximately five minutes. Although the coating appeared to bubble and glaze, the plywood was protected from the flame.

EXAMPLE 4

A coating of the composition of Example 1 was applied to a smooth concrete block wall in an amount adequate for a 10 mil coating. After curing, random test samples taken of the coating indicated that the thickness was greater than that anticipated and approximated 15 mils. It appears that the coating when applied to a standard thickness expands upon curing to provide greater than anticipated protection.

After curing for 48 hours, the blue flame of a blow torch was applied to the coating on the wall. Although the coating bubbled and glazed, it neither burned nor supported combustion.

EXAMPLE 5

A composition was prepared containing the following ingredients in which the percentages are based on the volume of the mixture including water.

| | |
|---|---|
| Lithium mica (W. G. Ground No. 88) | 18% |
| Nepheline syenite | 30% |
| Wollastonite | 9% |
| Aluminum trihydrate | 2% |
| Calcium sulfate | 2% |
| Sodium aluminum sulfate | 2% |
| Bicarbonate of soda | 1% |
| Vermiculite (raw) | 16% |
| Borax | 3% |
| Sodium silicate | 12% |
| Water | 5% |

In preparing the composition, the ingredients except for the sodium silicate, calcium sulfate, borax and bicarbonate of soda were placed in a blender with the blender at idle. Then a mixture of the sodium silicate and sufficient water to form a pumpable blend was added. The blender was operated at a relatively low speed producing blending and folding action. The blending was discontinued as soon as the materials were uniformly distributed within the blend. Immediately prior to application, the preblended materials were mixed with the calcium sulfate, bicarbonate of soda, borax and sufficient water to form a thick plaster-like consistency.

The mixture was troweled in a 75 mil layer upon a wall formed from cement blocks which had been stacked without the use of mortar. After a curing period of 50 hours, the wall was tested and found to possess considerable strength and resistance to dismantling. Upon prolonged standing, the wall did not demonstrate any cracking or other deterioration.

To evaluate the thermal barrier properties of the coating upon the wall, the blue flame of a blow torch was applied to the coating for 5 minutes. Although the coating appeared to bubble and expand and glaze, it neither supported combustion nor separated to expose the cement block to the flame.

EXAMPLE 6

A composition was prepared containing the following ingredients in which the percentages are based on the volume of the mixture including water.

| | |
|---|---|
| Lithium mica (W. G. Ground No. 88) | 15% |
| Nepheline syenite | 25% |
| Wollastonite | 9% |
| Aluminum trihydrate | 9% |
| Bicarbonate of soda | 2% |
| Sodium aluminum sulfate | 12% |
| Vermiculite | 10% |
| Borax | 3% |
| Sodium Silicate | 10% |
| Water | 7% |

The composition was prepared by blending the dry ingredients, except for the borax and bicarbonate of soda, to form a uniform mixture. Sufficient water was then added to form a pumpable material.

Immediately prior to application, the borax and bicarbonate of soda were added with sufficient water to form a sprayable mixture. A coating of the mixture 3/16 inch thick was then sprayed upon a plywood sheet ½ inch thick. After a suitable curing time of 50 hours, the sheet was inverted with the coated side down over a bunsen burner. The burner was lit and the temperature on both sides of the coated sheet were measured. As a result of the measurements, it was established that a 3/16 inch coating of the composition had an insulation value equivalent to 1½ inches of styrofoam and an insulating R factor of 4.3. It was also apparent from the visual inspection of the coating that where it had been exposed to the flame, the coating appeared to expand substantially.

From the foregoing examples, it can be seen that the thermal barrier composition of the present invention provides several unexpected properties. In addition to providing effective thermal barrier coatings, the compositions also provide coatings with significant insulating properties. Also, the compositions provide coatings that adhere exceedingly well to surfaces without the use of any organic binders. In addition, as illustrated in Example 5, it appears for some unknown reason that a given amount of the basic composition provides a thermal barrier coating for a greater area than that which would normally be anticipated.

In addition to their thermal barrier properties, the compositions of the present invention provide unusually attractive, decorative finishes for structural materials. As a result, the compositions are especially useful for coating wallboard to obtain a plaster-like effect. When so employed, it has been found that use of the basic composition eliminates the need to tape the joints between the wallboard which was previously considered to be a required practice. Another unique application for the novel compositions of the present invention is their use to provide insulating reflective surfaces. The interior of fireplaces and the like that are coated with the basic compositions can be glazed with a blow torch to provide a tile-like finish with a glass-like surface. The glazed surface not only protects the fireplace from the detrimental effects of heat but also reflects a substantial portion of the heat thus beneficially contributing to the heating properties of the fireplace. Still other applications of the novel compositions of the present invention will be apparent to those skilled in the art.

Although for purposes of illustration specific compositions have been described, it is to be understood that the invention is not to be so limited. It will be apparent to those skilled in the art that various changes can be made without departing from the spirit and scope of the invention. It is further to be understood that such changes are to be included in the coverage of the claims that follow.

I claim:

1. A composition which is particularly adapted for coating surfaces to provide them with a thermal barrier coating to protect them from the detrimental effects of fire which is comprised of an aqueous blend consisting essentially of (a) 5–25 volume percent lithium mica, (b) 1–60 volume percent wollastonite, (c) 1–50 volume percent aluminum trihydrate, (d) 25–70 volume percent nepheline syenite, (e) ½–3 volume percent sodium bicarbonate, (f) 10–15 volume percent sodium aluminum sulfate, (g) 1–15 volume percent borax, (h) 10–25 volume percent raw vermiculite, (i), 5–55 volume percent sodium silicate and water, the total water in the blend being less than about 30 volume percent.

2. A composition particularly adapted for coating structural surfaces to provide them with a coating that insulates, protects from the detrimental effects of fire, and lends structural strength to the surfaces, which comprises about 18% lithium mica; about 30% nepheline syenite; about 9% wollastonite; about 2% aluminum trihydrate; about 2% sodium aluminum sulfate; about 15% vermiculite about 2–6% of calcium sulfate; about ½–3% of bicarbonate of soda; about 3% borax; about 12% of sodium silicate and sufficient water to bring the volume to 100%.

3. A composition which is particularly adapted for coating surfaces to provide them with a thermal barrier coating to protect them from the detrimental effects of fire which is composed of an aqueous blend consisting essentially of (a) 5–25 volume percent lithium mica, (b) 1–60 volume percent wollastonite, (c) 1–50 volume percent aluminum trihydrate, (d) 25–70 volume percent nepheline syenite, (e) ½–3 volume percent sodium bicarbonate, (f) 1–10 volume percent sodium aluminum sulfate, (g) 2–6 volume percent hydrated calcium sulfate, (h) 10–25 volume percent raw vermiculite, (i) 1–16 volume percent borax, (j) 5–55 volume percent sodium silicate and water, the total water in the blend being less than about 30 volume percent.

4. The method of fireproofing and protecting from the detrimental effects of fire a flammable structural surface, which comprises applying to said surface a composition according to claim 1.

5. The method of fireproofing and protecting from the detrimental effects of fire a flammable structural surface, which comprises aplying to said surface a composition according to claim 3.

* * * * *